T. NESOM, DEC'D.
J. V. BRODBECK, ADMINISTRATRIX.
SUSPENDED OUTING TENT.
APPLICATION FILED NOV. 13, 1914.
1,209,479.
Patented Dec. 19, 1916.
2 SHEETS—SHEET 2.
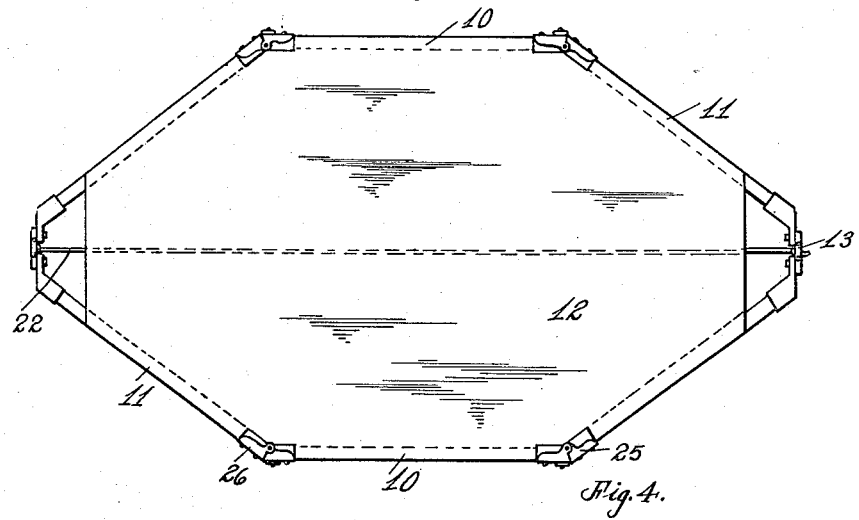
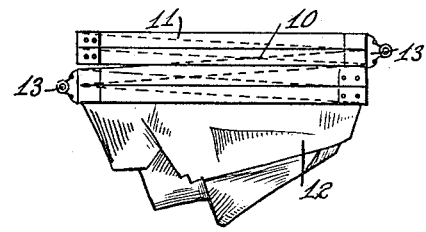
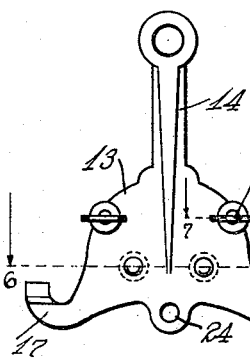
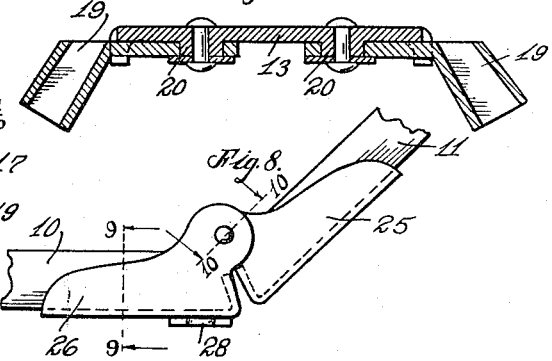
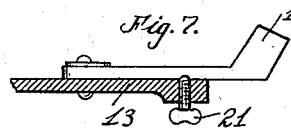
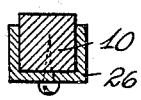
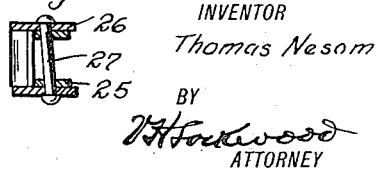
INVENTOR
Thomas Nesom
BY
ATTORNEY

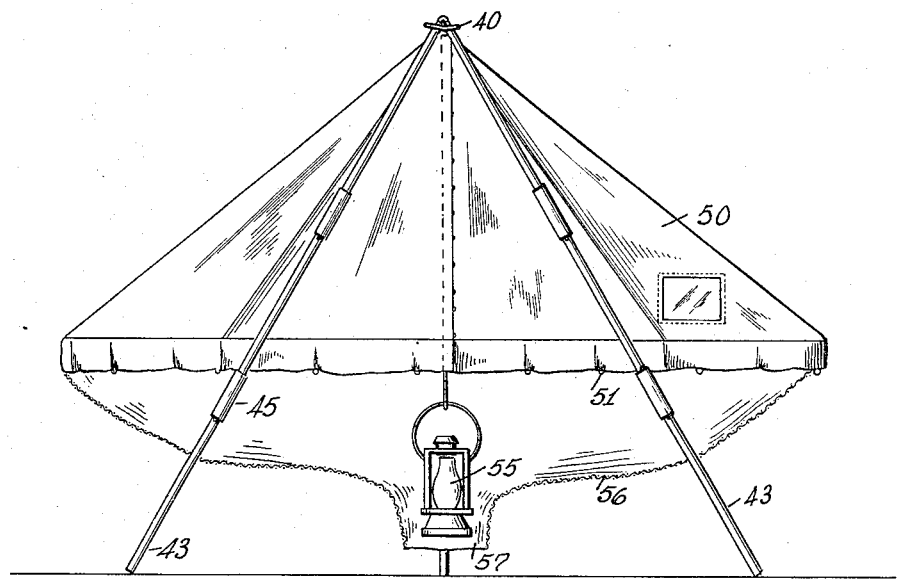
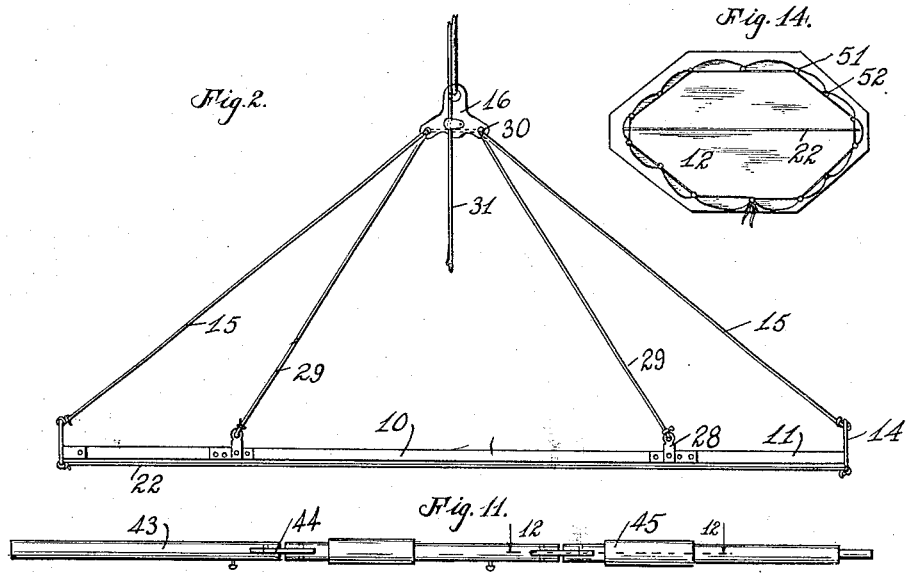
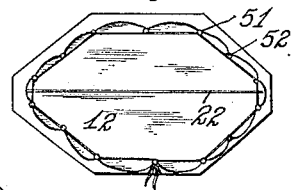

UNITED STATES PATENT OFFICE.

THOMAS NESOM, OF INDIANAPOLIS, INDIANA; JULIA V. BRODBECK ADMINISTRATRIX OF SAID THOMAS NESOM, DECEASED.

SUSPENDED OUTING-TENT.

1,209,479.

Specification of Letters Patent.

Patented Dec. 19, 1916.

Application filed November 13, 1914. Serial No. 871,892.

*To all whom it may concern:*

Be it known that I, THOMAS NESOM, a citizen of the United States, and a resident of Indianapolis, county of Marion, and State of Indiana, have invented a certain new and useful Suspended Outing-Tent; and I do hereby declare that the following is a full, clear, and exact description thereof, reference being had to the accompanying drawings, in which like letters refer to like parts.

The object of this invention is to improve the construction of suspended hammocks and the like, whereby they may be practically and conveniently suspended by central overhead means and be conveniently folded up or opened and made ready for use.

One feature of the invention consists in a practical tripod arrangement for suspending the hammock, whereby the tripod may be very quickly mounted and the tripod, as well as the hammock, can be quickly folded.

Another feature of the invention consists in combining the heating means mounted below the hammock with a covering for the hammock and the heating means.

Still another feature of the invention consists in the combination of the hammock thus suspended and a covering or tent, and means for drawing the lower edges of the tent toward each other under the hammock for more completely inclosing the hammock.

Another feature of the invention consists in means used in suspending the hammock which can be readily slipped for changing the level or inclination of the hammock.

Still another feature of the invention consists in the arrangement of the end brackets for supporting the hammock sections and providing the same with stops to prevent the complete collapse.

Another feature consists in the particular construction of the joint or coupling between the sections of the hammock, whereby the hammock can be quickly and conveniently folded.

The full nature of the invention will be understood from the accompanying drawings and the following description and claims.

In the drawings, Figure 1 is an elevation of the hammock supported by a tripod, parts being shown by dotted lines. Fig. 2 is an elevation of the hammock in suspended position and without the tent or covering and without any heating means. Fig. 3 is a plan view of the hammock without any supporting means. Fig. 4 is an elevation of the hammock folded together for transporting the same. Fig. 5 is an elevation of the bracket for supporting each end of the hammock frame, with parts omitted. Fig. 6 is a section on the line 6—6 of Fig. 5, with parts added thereto. Fig. 7 is a section on the line 7—7 of Fig. 5. Fig. 8 is a plan view of one of the joints of the hammock frame. Fig. 9 is a section on the line 9—9 of Fig. 8. Fig. 10 is a section on the line 10—10 of Fig. 8. Fig. 11 is a plan view of one of the braces with the joint sleeves uncovering the joints. Fig. 12 is a section on the line 12—12 of Fig. 11. Fig. 13 is a section on the line 13—13 of Fig. 12. Fig. 14 is a bottom view of the hammock portion in Fig. 1, with the heating means and inclosure omitted.

Two forms of the hammock are shown in Figs. 1 and 2. In the form shown in Fig. 1, the hammock is suspended by means of a tripod. In the form shown in Fig. 2, the hammock is suspended from some overhead means not shown.

The hammock frame is illustrated in Fig. 3, and consists of two side sections 10 and two oblique end sections 11 at the ends of the side sections 10. The canvas 12 is secured to said frame and forms the body of the hammock. The end sections 11 of the hammock frame fold up toward each other by means of their mounting on the bracket 13 which is substantially triangular having an upper arm 14 with which end cables 15 are connected at one end and at the other end with a suspension frame 16, as seen in Fig. 15. The bracket 13 has also two lateral arms 17 with inturned ends on which ferrule bars 19 rest which at their inner ends are pivoted on lugs 20 on the bracket 13, as shown in Fig. 6. The end bars 11 fit in the ferrule bars 19 and the arms 17 support the sides of the frames in a horizontal position. Stops 21 are connected with the bracket 13 for limiting the folding movement of the ferrule bars 19 so that the hammock cannot entirely collapse. A tie rope 22 runs under the canvas 12 and is connected with the bracket 13 through a hole 24, as seen in Fig. 5. It centrally supports the canvas bed 12 and can be adjusted with any desired degree of tension so as to make the bed comfortable. The sections 10 and 11 of the hammock frame are illustrated in Figs. 8 to 10. This consists of two hinged members 25 and 26 which have inwardly extending ears pivoted together by a vertical oblique pivot pin 27 so that when the two members 10 and 11 are folded together, one will fold at an angle to, above or below, the other instead of against its side, as seen in Fig. 4. This materially reduces the size of the device when folded. To each hinged member 26 there is a vertical arm 28 with which one end of a cable 29 is connected and the other end of the cable is secured to the suspension frame 16, as seen in Fig. 2. The cable 29 is secured in an eye 30 on said suspension frame so that the members of the cable do not have any relative movement, but the cable 15 which is connected with the ends of the hammock frame extends loosely and horizontally through the suspension frame and is held in position by the frictional engagement therewith so that one can readily tilt the hammock to any desired comfortable position or inclination by slipping the cable 15 longitudinally one way or the other through the suspension frame 16.

When the hammock is swung from the branch of a tree or other overhead means, a cable 31 is used which at one end is tied through a hole in a suspension frame and then the cable is extended up over the branch of the tree and the lower end passes between toothed clamping members which are pivoted to the side of the suspension member 16, as shown in Fig. 2, and the cable extends down below said suspension frame so that the hammock can be readily elevated by pulling down on the lower end of the cable 31 and when it is released the clamps will catch it and hold it in position. The hammock may be suspended from a tripod and this is accomplished by placing a triangular tripod frame 40 over the upper portion of the suspension frame 16 by means of a slot in the frame 40 and then inserting a set screw or other holding means 41 in the frame 16 just above the frame 40.

Regardless of the manner of suspending the hammock, it may be covered with a tent or canvas covering 50, as shown in Fig. 1, said covering resting upon the cables 15 and 29 and extending over the sides of the hammock frame and below the same and along the lower edge it is provided with eyes 51 through which a cord or rope 52 may be passed, as shown in Fig. 14, whereby the lower edge of the tent covering may be drawn inward under the hammock for more effectually closing the hammock and prevent the wind from blowing up the lower part of the tent.

This construction is used by a great many people for sleeping out of doors in winter as well as in the summer and in cold weather it can be heated by hanging a lantern 55 or other heating means under the center of the hammock on the tie cord 22. To inclose the heat, a canvas bottom 56 is secured to the underside of the hammock frame and tapers downward toward the lantern so as to inclose the underside of the hammock excepting below the lantern and leave a sufficient opening 57 below the hammock for the admission of air to the lamp or heating means.

The invention claimed is:

1. A hammock including a frame formed of sections, and hinges for uniting the sections, said hinges having inclined pivots whereby the hammock sections may be folded at an angle to each other, substantially as set forth.

2. A hammock including a hammock frame, central overhead supporting means, cables extending from the frame up to said supporting means, a canvas covering over said cable and extending below the sides of said hammock, a bottom covering secured to said hammock frame and tapering outward, and heating means suspended to said hammock and within said bottom covering.

In witnesses whereof, I have hereunto affixed my signature in the presence of the witnesses herein named.

THOMAS NESOM.

Witnesses:
J. H. WELLS,
R. G. LOCKWOOD.

Copies of this patent may be obtained for five cents each, by addressing the "Commissioner of Patents, Washington, D. C."